United States Patent [19]
Jones

[11] Patent Number: 5,154,480
[45] Date of Patent: Oct. 13, 1992

[54] CONVERTIBLE TRAILER

[76] Inventor: Thomas J. Jones, 7162 Ave. 424, Dinuba, Calif. 93618

[21] Appl. No.: 574,819

[22] Filed: Aug. 30, 1990

[51] Int. Cl.⁵ .............................................. B60P 7/02
[52] U.S. Cl. .................................. 296/181; 296/36; 296/100; 280/789; 105/378
[58] Field of Search ................ 280/411.1, 418.1, 789, 280/DIG. 8; 296/181, 182, 56, 100, 36; 105/378

[56] References Cited
U.S. PATENT DOCUMENTS

| | | | |
|---|---|---|---|
| 831,915 | 9/1906 | Winans | 296/56 |
| 1,952,883 | 3/1934 | Nelson | 296/56 |
| 3,186,756 | 6/1965 | Saut et al. | 296/100 |
| 4,302,044 | 11/1981 | Sims | 296/100 |
| 4,489,975 | 12/1984 | Fredin | 105/378 |
| 4,526,417 | 7/1985 | Dinkel et al. | 296/181 |
| 4,556,248 | 12/1985 | Kobayashi | 296/181 |
| 4,627,658 | 12/1986 | Vold et al. | 296/100 |

FOREIGN PATENT DOCUMENTS

| | | | |
|---|---|---|---|
| 0233629 | 10/1963 | Austria | 105/378 |
| 0004421 | 1/1985 | Japan | 296/36 |
| 0117720 | 9/1969 | Norway | 296/181 |

Primary Examiner—Charles A. Marmor
Assistant Examiner—Anne Boehler
Attorney, Agent, or Firm—Learman & McCulloch

[57] ABSTRACT

Disclosed is a pair of truck trailers, the first of which mounts on the fifth wheel of a pull-truck and has a single axle at the rear end and the second of which has a front axle and a rear axle and connects to the rear of the first trailer. Each of the pair of trailers is convertible from a flat-bed configuration for hauling units of finished lumber into a gondola configuration for hauling wood chips. Each trailer has a body consisting of a pair of upstanding, oppositely disposed sidewalls which are hinge mounted in a frame on the trailers and move from a vertical position forming the sides of a gondola body to a flat-bed condition wherein the sidewalls pivot upwardly into an over-lapped horizontal condition and form a flat-bed body with a top over the flat-bed.

10 Claims, 5 Drawing Sheets

CONVERTIBLE TRAILER

BACKGROUND ON INVENTION

This invention relates generally to highway trucks and trailers, particularly to a pair of trailers. The front trailer mounts on a fifth wheel on the rear of the truck and has a single rear axle and the rear trailer has a front and real axle and connects at its front end to the rear of the front trailer. The body of each trailer has a configuration which is capable of conversion from a flat-bed configuration to a gondola configuration.

In the lumber industry it has become common practice for lumber pieces, which become scraps at the lumber mill because they cannot be made into commercial cuts, to be turned into wood chips which are used as a source of energy for powering the mill. In hauling commercial lumber from the mill, to a use location, often several hundred miles away, it is economical for the trucks which haul the finished lumber to the job site to carry back a load of chips for generation of energy at the mill.

Finished lumber is typically banded together in units which constitute a particular customers order. These units are loaded by forklift onto a flat-bed trailer for hauling. When these lumber units are delivered to the job site area, the trailers must return to the mill empty even though a substantial supply of chips may be available. This occurs because a flat-bed type trailer cannot haul wood chips. A gondola style trailer is necessary for hauling chips. Accordingly, substantial economies are available if the same flat-bed type trailers which haul banded finished lumber units to the construction site can be converted to a gondola style trailer. Then when a trucker using a flat-bed trailer to haul lumber to the construction location unloads he can convert his trailers to a gondola type trailer to be filled with wood chips for his return trip to the mill. However, at the mill he now has gondola type trailers, but he can easily convert them back to flat-bed trailers in order to haul finished lumber again.

Numerous trailers have been disclosed in the prior art which are convertible to different body configurations for different uses but none of these will provide the conversion from a flat-bed to a bulk materials body such as required in the lumber hauling industry. A patent search has revealed the following United States patents which are representative of this prior art:

U.S. Pat. No. 4,007,567
U.S. Pat. No. 4,302,044
U.S. Pat. No. 3,709,552
U.S. Pat. No. 4,545,611
U.S. Pat. No. 4,682,811
U.S. Pat. No. 2,263,105
U.S. Pat. No. 3,097,012
U.S. Pat. No. 3,181,909
U.S. Pat. No. 4,613,182
U.S. Pat. No. 4,526,417
U.S. Pat. No. 4,489,975

The patents to Broadbent, (U.S. Pat. No. 3,709,552); Bain (U.S. Pat. No. 2,097,012); and Stone (U.S. Pat. No. 4,613,182); show the most similar van bodies to my convertible trailer however none discloses a trailer which readily converts from a flat bed configuration to a gondola or bulk type body needed by the lumber industry. The other prior art disclosures are considerably less similar and are used for conversions which are not truly applicable.

I am now advised however, that a new trailer unit is now being marketed by Western Trailers of Boise Id. which provides conversion from a flat-bed body to a bulk materials body by using flexible material on rolls on each side, and forming an enclosing body by unrolling the materials and streching it over the side area. This trailer has substantial limitations however, in that the flexible material does not provide the needed support of a solid side-wall and is vulnerable to tearing by the materials being hauled or by engagement with foreign objects such as other vehicles or buildings.

It is a major object of this invention to provide trailers for a highway truck which are readily convertible from a flat-bed type to a gondola or bulk-material type trailer.

It also an important object of this invention to provide a lumber products trailer of the type described in which the hauling costs can be minimized by hauling finished lumber on the first leg of a haul and wood chips on the return leg.

It is a further object of this invention to provide a trailer of the type described in which an elevated generally rectangular frame is constructed on the trailer bed and opposing side panels are hinge mounted to the upper portion of the frame and disposed to swing upwardly from a generally vertical position on the trailer bed forming a gondola type trailer to a generally horizontal position forming an over-lapping top above the trailer flat-bed.

It is still another object of this invention to provide trailers which can be readily converted from a flat-bed to a gondola configuration which has split side panels of solid sheet material that join together and are staked to the trailer bed by lock braces when the side panels are serving as the vertical side walls forming a gondola type trailer and pivot into said over-lapping position on top of the trailer structure by means of electrical wenches when the trailer is used as a flat-bed.

It is a further object of this invention to provide a convertible trailer of the type described in which the cost of converting the trailer is substantially reduced, and the conversion time is minimal and can be readily achieved by a driver.

These and other objects and advantages of my invention will become more readily apparent from the following detailed description of a preferred embodiment when read together with the accompanying drawings in which.

DETAILED DESCRIPTION OF PARTS

Referring now to the drawings, the numeral 10 designates a preferred embodiment of a first of my truck trailers, which is convertible from a flat-bed type trailer to a gondola type trailer. The trailer 10 has a chassis 12 with an axle and wheels 14 at its rear end. At its front end, the chassis has a pin 16 disposed to attach the trailer to the fifth-wheel on a pulling vehicle, and at its rear end connects to a second trailer.

Figure 3:
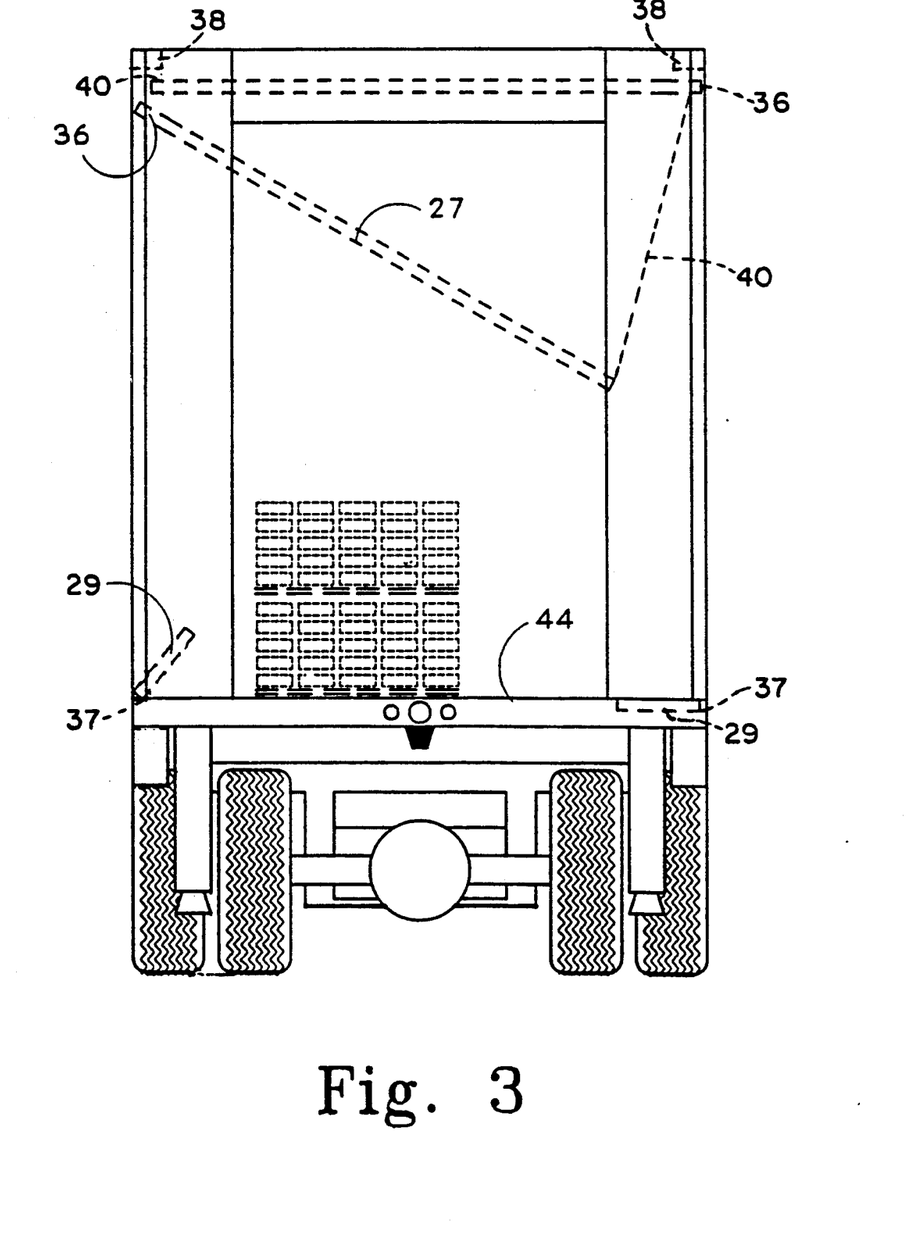
FIG. 3 is a rear elevational view of one of my trailers shown in FIG. 1 with a quantity of banded finished lumber on the flat-bed and the sidewalls (in phantom) moving to their stowed position.

A frame 18 is mounted on said chassis 12 and extends upwardly therefrom. The frame 18 is generally rectangular in configuration and has a front portion 20 and a rear portion 22. The frame 18 also has longitudinally extending rails 24, which extend in space parallel alignment between the upper portion of the front end 20 and upper portion of the rear end 22. The longitudinal rails 24 have four cross members 26 as well as a front member and a rear member, which extend between the rails for lateral support. Two up-standing side-walls 27 are provided which, when vertical, extend between the chassis 12 and the longitudinally extending rails 24. A plurality of ice braces 28 are provided on each of the side-walls 27 which interlock with a side-wall skirt 29 to strengthen the side-walls when the trailer is used as a gondola. The side-wall skirts 29 are pivotally mounted on the trailer chassis 12 and move from a retracted position flush with the trailer bed to an upstanding position where they interlock with and extend the lower edge of the side-wall 27 since the side-wall height is restricted to the width of the trailer. The height of side-wall 27 is limited to the cross width of the trailer bed so that it will fit between the frame members 24, when it is pivoted into its horizontal top position overlapping the opposite side-wall. Because the side-wall 27 can not extend past the allowable distance permitted by the highway rules relating to vehicle width, the side-wall skirts 29 are added and interlocked with lower ends of the side-walls to form the complete split side-wall. The side wall skirts 29 are pivotally attached to the chassis 12 at 37. When the side wall skirts 29 are pivoted to horizontal positions, their upper surfaces are flush with the floor 44 as shown in FIG. 3.

Figure 1:
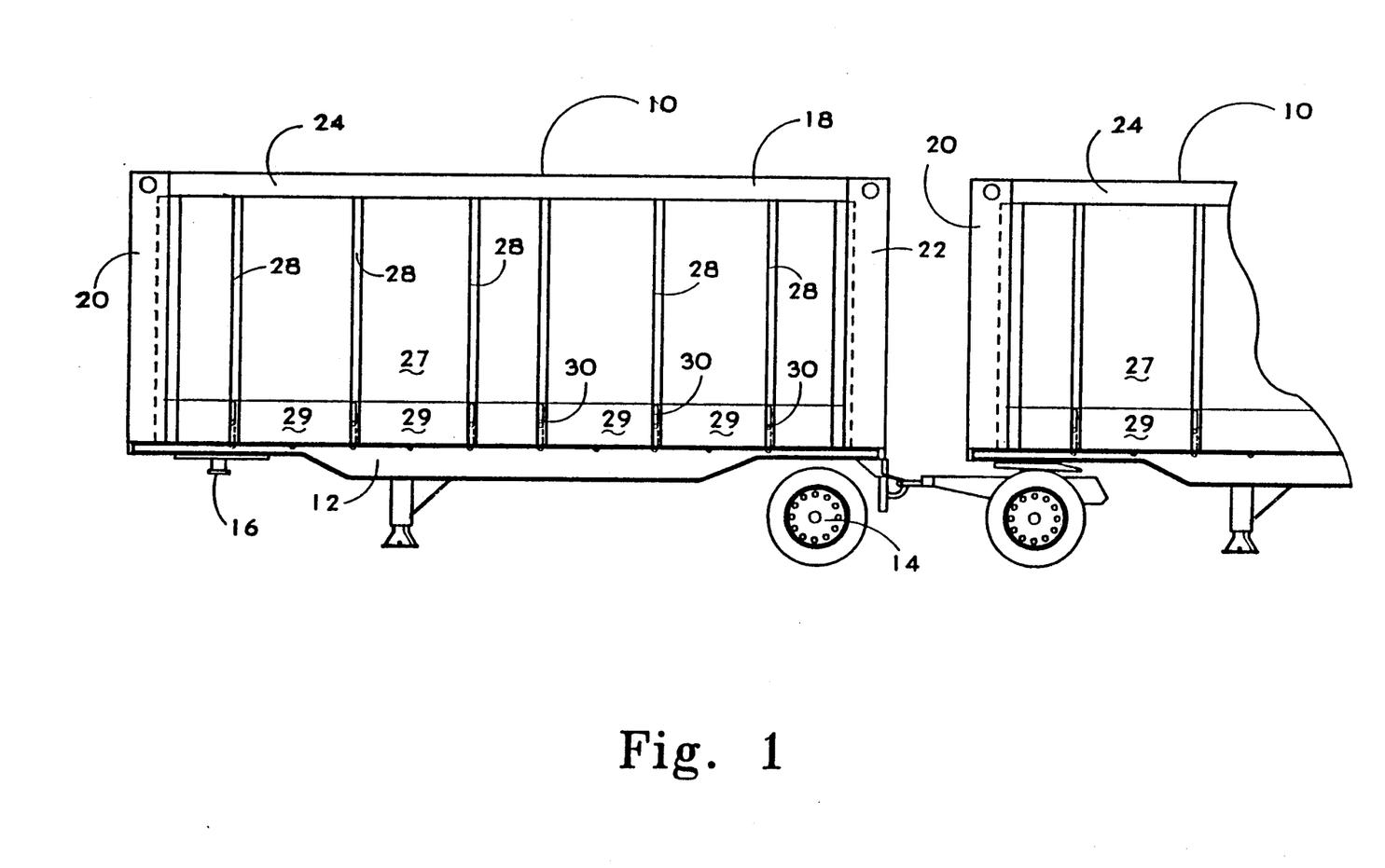
FIG. 1 is a partial side elevational view of a preferred embodiment of a pair of my trailers.
Figure 2:
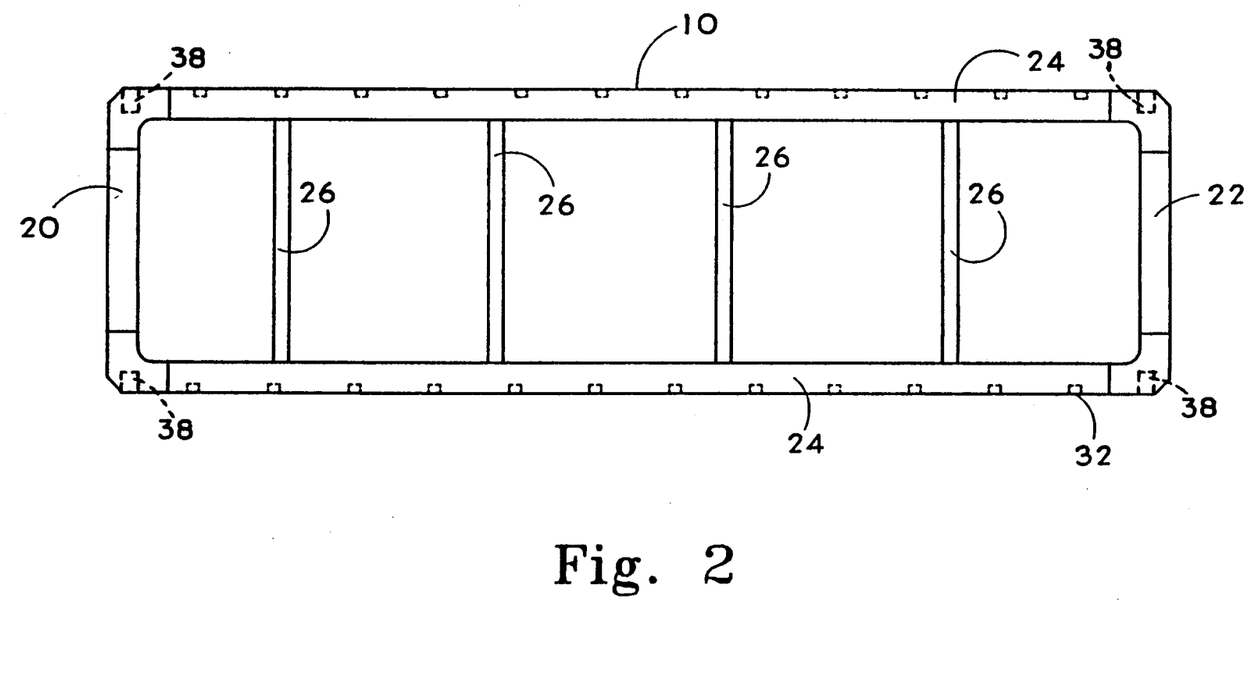
FIG. 2 is a plan view of a preferred embodiment of one of my trailers shown in FIG. 1.
Figure 4:
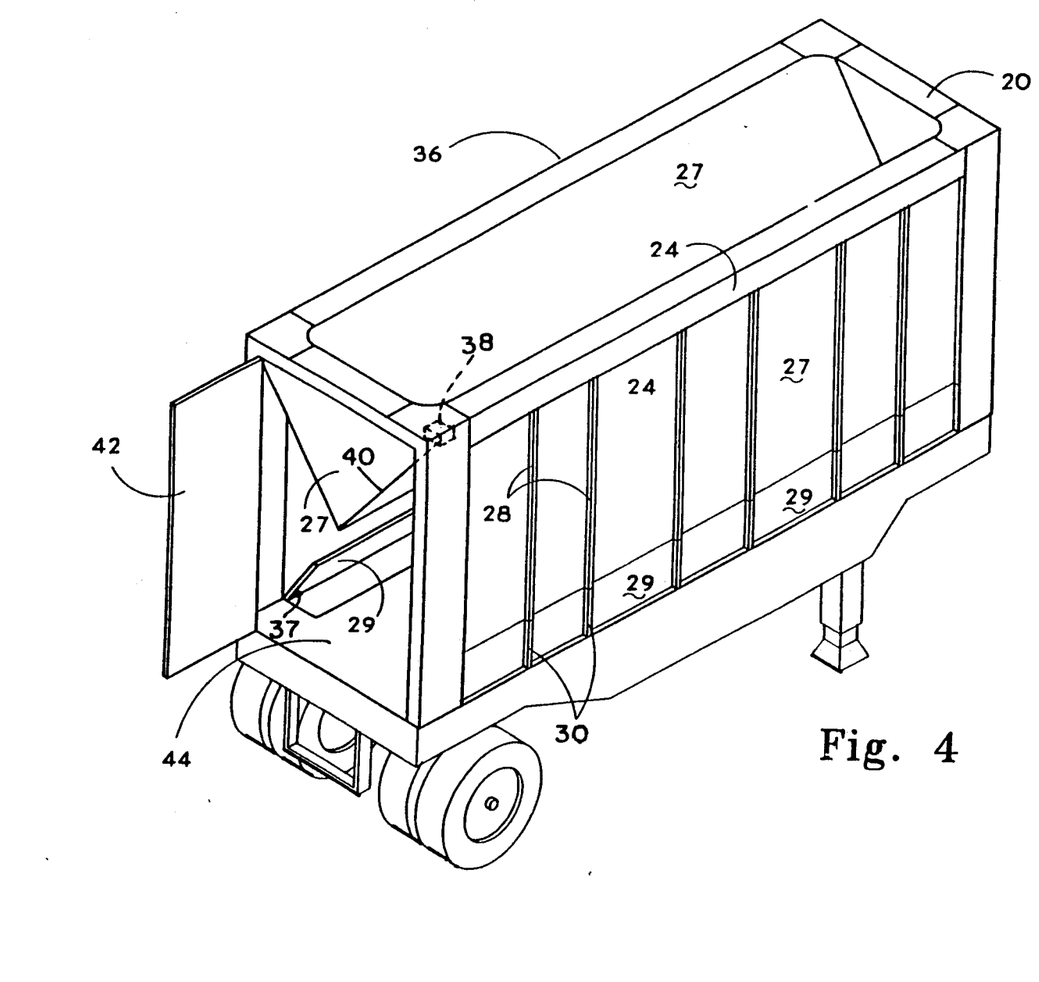
FIG. 4 is a perspective view of the trailer shown in FIG. 4.
Figure 5:
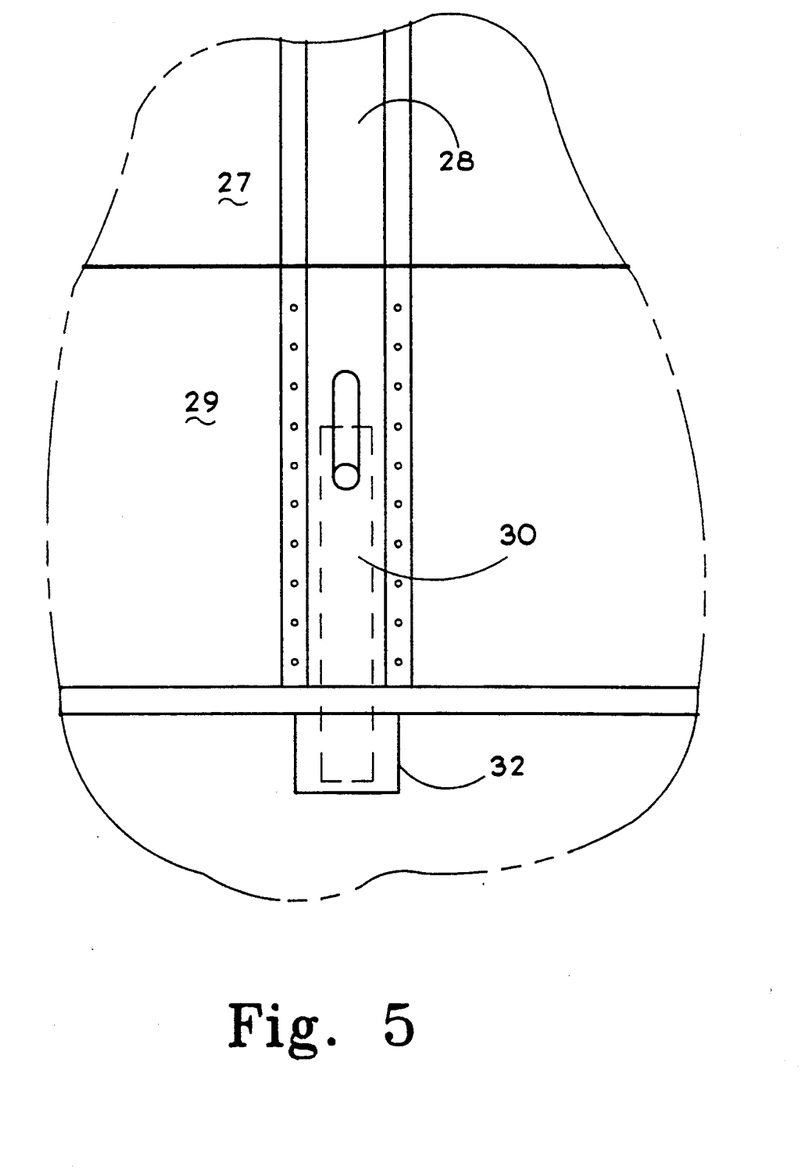
FIG. 5 is an enlarged view of a portion of the side panel stakes used to hold the trailer sides in their vertical position when the trailer serves as a bulk materials hauling device.

As best shown in FIGS. 1 and 5 the lower ends of each of the side braces 28 have extendible cleats 30 which are movably extendable at their lower ends into recesses 32 in the side-wall skirts 29 and the chassis of the trailer. When so extended, the side braces 28 prevent any bowing out between the chassis side-wall skirts and the side walls. Along their upper ends, the side walls 27 are connected to the longitudinal rails 24. As best shown in FIGS. 3 and 4 the side-walls 27 are mounted on hinges 36 along their upper edges which pivotably connect them to the longitudinal rails 24. These side-walls 27 and their side braces 28 are movable about the hinges 36 from a generally vertical position to a generally horizontal position spaced above and forming top spaced above the chassis bed. The pivotal movement of the side walls 27 is accomplished by electric winches 38 mounted in each corner of the trailer frame 18, which have flexible cables 40 connected to each of the lower most corners of the side walls 27, just above the place of their junction with their respective side-wall skirt.

When the electric winches 38 are activated they pivot the side walls 27 from their vertical position into their upper horizontal position above the trailer bed, they over-lap and form a top for the trailer body frame 18.

As best shown in FIG. 4 the trailer 10 also has an up-right rear door 42 mounted in the frame 18 for convenience in loading the trailer when it is used in its flat-bed form.

In operation, the trailer is first set-up as a flat-bed trailer by pivoting the side walls 27 on their hinges 36 and retracting the side-wall skirt 29 into the trailer floor to leave the trailer sides open for loading. This maneuver places the side-walls 27 in a generally horizontal over-lapping condition between the longitudinal rails 24 of the frame to form a top over the flat-bed and retracting the side-wall skirt into the trailer floor. The rear door 42 can be opened if necessary for loading or unloading. Also, a floor 44 is disposed on the chassis 12 to form a bottom for the flat-bed. Finished lumber, which is banded into units for shipment, may then be readily loaded by forklift onto the trailer flat-bed. When finished lumber is unloaded by forklift from the trailer at the delivery site, the trailer may be converted into a gondola by pivoting the side walls 27 and their attached upright supports 28 downwardly into an upright position moving the side-wall skirts into interlocking position with the side-walls and securing the adjoining ends of the side-walls and side-wall skirts to the trailer chassis by means of the side cleats 30. When the trailer is converted into a gondola form, the back door is, of course, locked and the trailer may then be loaded from the top with wood chips. Thus, when my trailers may be used to carry finished lumber to a job site as a flat-bed, it may be readily converted to a gondola type trailer body and loaded with wood chips.

Normally the second trailer is attached to the rear of the first trailer 10 so that the pair of trailers increase the load which can be hauled. The second trailer has a body substantially identical to the first trailer but a front axial and wheels as well as the rear axial and wheels. Also the second trailer has a towing tongue which attaches to the rear of the first trailer. Also, if desired, a single trailer longer than either trailer of my pair of trailers can be used in place of the dual-trailers.

From this detailed description of my invention it should be readily understood that it is fully capable of attaining the objects and advantages heretofore attributed to it.

I claim:

1. A truck trailer having a body which is convertible from a flat-bed type trailer to a gondola type trailer comprising:
   a chassis having running gear attached thereto disposed to support the trailer on a road-way;
   a floor forming a generally horizontal flat-bed on said chassis;
   a generally rectangular super-structure projecting above said chassis, said super-structure having a front portion disposed adjacent the front of said chassis and a rear portion disposed adjacent the rear of said chassis and a pair of generally longitudinal rails horizontally disposed and extended in parallel relationship in the upper portion of said super-structure, between said front portion and said rear portion;
   a plurality of cross beams mounted in parallel relationship between said longitudinal rails and disposed to provide structural support for said longitudinal rails; and
   a pair of side-wall panels each forming one of the side-walls for said trailer when said side-walls are disposed in generally vertical orientation and extended between said longitudinal rails and said chassis to form a gondola, each of said panels being hinged at its upper edge to a separate one of said longitudinal rails to allow its lower edge to pivot inwardly and upwardly to positions in which said panels are in a generally horizontal overlapping orientation in said super-structure with one of said side-wall panels above the other side-wall panel to form a top spaced above said flat-bed.

2. A truck trailer as described in claim 1 which further includes:

power means mounted on said super-structure and interconnected between said super-structure and said side-wall panels, said power means being actuatable to swing each of said side-wall panels about their hinge connection on one of said longitudinal rails from a generally vertical disposition where said side-wall panels form vertical sides of a gondola on said trailer body to a generally horizontal position where said side-wall panels overlap to form a top for said trailer spaced above and parallel to said flat-bed.

3. A truck trailer as described in claim 1 which further includes:

upright support members mounted in spaced parallel condition along each of said side-wall panels and disposed to maintain said side-wall panels rigid during movement from their vertical position to their horizontal position; and engagement means operatively associated with said upright support members and said chassis to secure said side-wall panels in their vertical gondola forming positions on said chassis.

4. A truck trailer as described in claim 1 which further includes:

a pair of extension panels mounted on said chassis adjacent each of said side-wall panels, said extension panels being pivotally mounted to said chassis and each having a distal edge pivotally upstanding vertically from said flat-bed which has an edge that mates with the lowermost edge of said side-wall panels to complete the gondola body shape for said trailer.

5. A truck trailer as described in claim 1 in which:

a pair of extension panels is mounted on said chassis adjacent each of said side-wall panels, said extension panels being pivotally attached to said chassis and each having a distal edge that mates with the lowermost edge of one of said side-wall panels to complete the gondola body shape for said trailer when the extension panel is pivoted to a generally vertical position;

a plurality of extendible cleats mounted in spaced parallel positions on each of said side-wall panels and disposed to extend downwardly when said side-wall panels are vertical, and recess means on said chassis disposed to receive said cleats and secure said side-wall panels to the flat-bed of said chassis.

6. A truck trailer which is convertible from a flat-bed type trailer to a gondola type trailer comprising:

a chassis having running gear attached thereto disposed to support said trailer on a road-way;

a floor forming a generally horizontal flat-bed on said chassis;

a super-structure generally rectangular in form and projecting above said chassis, said super-structure having a front end and a rear end oppositely disposed at each end of said chassis, and a pair of longitudinal rails disposed therebetween and attached to said front end and said rear end;

a plurality of cross beams mounted between said longitudinal rails and disposed to provide structural support for said rails;

a pair of side-walls each of which is hinged at one edge to a separate ne of said longitudinal rails and is pivotal between a vertical position and a horizontal position and wherein each of said side-walls has dimensions sufficient to extend between said longitudinal rails and said chassis when disposed in a generally vertical position and generally between said pair of longitudinal rails when disposed in a generally horizontal overlapped position adjacent to the bottom of said cross beams and spaced directly above said flat-bed;

upright support members mounted in spaced parallel position on each of said side-walls and disposed to pivot with said side-walls from their vertical position to their horizontal position, said upright support members having extendible cleats in the lower ends thereof; and recesses operatively associated with the chassis of said trailer and disposed in alignment with said cleats in said support members when said side-walls are pivoted into an upright position on the flat-bed of said trailer.

7. A truck trailer of the type described in claim 6 in which:

said side-walls pivot about their upper edge for movement between an upright generally vertical position to form sides of a gondola type body and an overlapped horizontal position spaced above said flat-bed to form a top above said flat-bed type body;

said upright support means are formed integral with said side-walls and provide support for said side-walls when in either their vertical or horizontal positions; and drive means interconnected between said side-walls and said super-structure and operable to pivot said side-walls between said upright vertical position and said horizontal top forming position.

8. A truck trailer of the type described in claim 6 which further includes:

a pair of wall extensions each mounted on opposite sides of said chassis below said side-walls and each having their lower edges pivotally mounted on said chassis and being pivotal for movement from an upwardly projecting position on said flat-bed to a retracted position flush with said flat-bed, each said wall extension being disposed in its upwardly projecting position to engage the lowermost edge of one of said side-walls when said side-walls are disposed in said vertical position.

9. A truck trailer of the type described in claim 6 in which:

said side-walls pivot about their upper edge for movement between an upright generally vertical position to form sides of a gondola type body and an overlapped horizontal position spaced above said flat-bed to form a top above said flat-bed type body;

said upright support means are formed integral with said side-walls and provide support for said side-walls when in either their vertical or horizontal positions;

drive means interconnected between said side-walls and said super-structure and operable to pivot said side-walls between said upright vertical position and said horizontal top forming position; and a pair of wall extensions each mounted on opposite sides of said chassis below said side-walls and each having their lower edges pivotally mounted on said chassis and being pivotal for movement from an upwardly projecting position on said flat-bed to a retracted position flush with said flat-bed, said wall extensions being disposed in their upwardly projecting position to engage the lowermost edge of one of said side-walls when said side-walls are disposed in said vertical position.

10. A truck trailer of the type described in claim 6 in which:

winches are interconnected between said side-walls and said super-structure and said winches are operable to pivot said side-walls between said upright vertical position and said horizontal top forming position and back again.

* * * * *

UNITED STATES PATENT AND TRADEMARK OFFICE
CERTIFICATE OF CORRECTION

PATENT NO. : 5,154,480

DATED : October 13, 1992

INVENTOR(S) : Thomas J. Jones

It is certified that error appears in the above-identified patent and that said Letters Patent is hereby corrected as shown below:

Column 3, line 19, change "ice" to -- side --.

Column 6, line 2, after "disposed" insert

-- transversely --; line 5, change "ne" to -- one --.

Signed and Sealed this

Twenty-first Day of September, 1993

*Attest:*

*Attesting Officer*

BRUCE LEHMAN

*Commissioner of Patents and Trademarks*